(12) United States Patent
Georgescu et al.

(10) Patent No.: US 9,476,753 B2
(45) Date of Patent: Oct. 25, 2016

(54) FEED-THROUGH FOR GWR MEASUREMENTS IN TANKS

(71) Applicant: HONEYWELL INTERNATIONAL INC., Morristown, NJ (US)

(72) Inventors: Ion Georgescu, Bucharest (RO); Cornel Cobianu, Bucharest (RO); Stuart James Heath, Surrey (CA); Michael Kon Yew Hughes, Vancouver (CA); Frank Martin Haran, North Vancouver (CA)

(73) Assignee: Honeywell International Inc., Morristown, NJ (US)

( * ) Notice: Subject to any disclaimer, the term of this patent is extended or adjusted under 35 U.S.C. 154(b) by 341 days.

(21) Appl. No.: 14/229,216

(22) Filed: Mar. 28, 2014

(65) Prior Publication Data

US 2015/0276460 A1 Oct. 1, 2015

(51) Int. Cl.
*G01F 23/284* (2006.01)
*G01S 7/02* (2006.01)
*G01F 23/00* (2006.01)
*G01S 7/00* (2006.01)

(52) U.S. Cl.
CPC .............. *G01F 23/284* (2013.01); *G01S 7/02* (2013.01)

(58) Field of Classification Search
CPC ...... G01F 23/22; G01F 23/28; G01F 23/284; G01F 23/26; G01F 23/261; G01F 23/263; G01F 23/265; G01F 23/266; G01F 23/268; H01B 11/18; H01B 11/1808; G01S 7/02
See application file for complete search history.

(56) References Cited

U.S. PATENT DOCUMENTS

| | | | | |
|---|---|---|---|---|
| 2,622,152 | A * | 12/1952 | Rosch ................ | H01B 11/1808 174/102 SC |
| 3,214,655 | A * | 10/1965 | Di Giacomo ......... | G01F 23/268 361/276 |
| 4,417,473 | A * | 11/1983 | Tward ................... | G01F 23/263 361/284 |
| 4,730,489 | A * | 3/1988 | Hoekstra ............... | G01F 23/263 324/689 |
| 4,924,702 | A * | 5/1990 | Park ...................... | G01F 23/268 324/690 |

(Continued)

FOREIGN PATENT DOCUMENTS

EP 0780664 A2 6/1997
EP 2520909 A1 11/2012

*Primary Examiner* — Bernarr Gregory
(74) *Attorney, Agent, or Firm* — Jetter & Associates, P.A.

(57) ABSTRACT

A coaxial feed-through device (feed-through) for coupling a received process connection to a storage tank (tank) including an inner electrical conductor (probe), an outer electrical conductor; and a dielectric sleeve disposed between the probe and the outer electrical conductor. The dielectric sleeve is configured to provide an upper coaxial transmission line segment (upper CTL segment) providing a substantially 50 ohm impedance and a lower coaxial transmission line segment (lower CTL segment) which includes one or more sub-segments having an impedance that is at least forty (40%) percent higher as compared to the substantially 50 ohm impedance.

20 Claims, 8 Drawing Sheets

(56) References Cited

U.S. PATENT DOCUMENTS

| | | | |
|---|---|---|---|
| 5,063,778 A | 11/1991 | Jorritsma | |
| 5,481,197 A * | 1/1996 | Sanders | G01F 23/268 324/690 |
| 5,609,059 A | 3/1997 | McEwan | |
| 5,926,152 A | 7/1999 | Schneider | |
| 6,118,282 A * | 9/2000 | Grieger | G01F 23/284 324/637 |
| 6,148,681 A * | 11/2000 | Gravel | G01F 23/268 73/866.5 |
| 6,178,817 B1 * | 1/2001 | Hewelt | G01F 23/284 324/637 |
| 6,229,476 B1 | 5/2001 | Lutke et al. | |
| 6,247,362 B1 * | 6/2001 | Soroka | G01F 23/284 73/290 V |
| 6,386,055 B1 * | 5/2002 | Eason | G01F 23/284 324/642 |
| 6,417,445 B1 * | 7/2002 | Sato | H01B 11/1808 174/28 |
| 6,452,467 B1 | 9/2002 | McEwan | |
| 6,642,807 B1 * | 11/2003 | Gard | G01F 23/268 333/24 R |
| 6,681,626 B2 | 1/2004 | Fünfgeld | |
| 6,856,142 B2 | 2/2005 | Schroth et al. | |
| 7,249,504 B1 | 7/2007 | Wendler | |
| 7,401,511 B2 | 7/2008 | Dietmeier | |
| 7,467,548 B2 | 12/2008 | Fredriksson | |
| 2005/0268715 A1 | 12/2005 | Sabatino | |

\* cited by examiner

FEED-THROUGH FOR GWR MEASUREMENTS IN TANKS

FIELD

Disclosed embodiments relate to feed-throughs for guided wave radar (GWR) level measurements of products in storage tanks.

BACKGROUND

It is standard practice to use large storage tanks also known as vessels (hereafter "tanks") for storing a variety of products including liquids, such as beverage and petroleum products, as well as solid products such as powders. Conventionally, such storage tanks are usually made from non-stainless steel plates, and in the case of petroleum products the tanks are generally made from ¼ inch (0.63 cm) to ½ inch (1.27 cm) thick steel plates welded together. The dimensions of conventional storage tanks usually range in the hundreds of feet (100 feet=30.5 meters) in height and hundreds of feet in diameter.

Contact electromagnetic detection and sensing such as based on GWR may be used to determine the presence or signatures (object classification or shape) of objects, levels or the distance to the surface of materials, when other sensing methods may have difficulty in providing reliable and/or accurate information. For example, in the oil and gas industry, inaccurate or unreliable level measurements can incur a significant loss of profitability/revenue in tank level gauging applications. An error of 1 millimeter (mm) for a level measurement in storage tanks being 40 to 80 meters in diameter can correspond to a volumetric error of several cubic meters. Since the crude oil price is generally at least $70 per barrel (1 barrel=42 US gallons or 159 liters), the 1-mm error can result in thousands of dollars loss for one or more parties involved in trading and oil transfer. Measurements of a product level and/or interface between two products having a different dielectric constant located at distances greater than about 50 m below the top of the tank is also known to be a challenge for GWR level systems to provide accurate measurements.

In a known GWR system arrangement, the microwave components along the propagation path from the electronic block (including a processor, digital to analog converter (DAC) for transmitting and analog to digital converter (ADC) for receiving and a transceiver) which generates a microwave signal is launched along a guiding probe to the product surface/interface to be measured by including a 50 ohm coaxial cable coupled to the transceiver, with the coaxial cable being coupled to an overall essentially 50 ohms coaxial feed-through. The feed-through has its outer conductor "sleeve" either welded to the flange on a 120 to 180 ohm metal cylindrical tank nozzle (the impedance depending on the probe diameter and nozzle diameter) having an aperture, or is threaded to an aperture in the top surface of the tank over a tank aperture. The probe within the tank is electrically and mechanically connected to the central conductor of the feed-through device and its length is dependent on the application requirements. The impedance of the probe in free-space is about 370 ohms.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize in the case of a storage tanks or vessels (hereafter "tanks") having nozzles using conventional nozzle process connections including a coaxial feed-through device (hereafter generally "feed-through") welded to a flange around the nozzle of the tank, there are impedance mismatches at the transition between the feed-through's output of about 50 ohms ($\Omega$) and the nozzle input (typically 120 to 80$\Omega$), and from the output of the nozzle to the inner metal probe in free-space (370$\Omega$) inside the tank. In the case of conventional feed-throughs for nozzle-less tanks which may be threaded directly to the top surface of the tank without the need for a flange, the impedance mismatch is even worse, because the impedance is abruptly changed from about 50$\Omega$ specific to 370$\Omega$ (the metal probe impedance in free-space). In the case of non-metallic tanks, generally comprising polymers or polymer composites (hereafter "polymer-based"), the impedance mismatch situation is similar, i.e. an abrupt change from 50$\Omega$ to 370$\Omega$, and the assembly of the microwave and process sealing components is even more complex, as the feed-through is threaded to a leak-proof metallic coupling device which is attached to the top of the non-metallic tank.

Such impedance mismatches for both types of process connections (feed-through welded to the flange of the tank nozzle or a feed-through threaded to the top surface of the tank) generate microwave power losses during transmit and receive during signal propagation along the nozzle and the top of the tank. In addition to these impedance mismatch-based microwave power losses, there are microwave power losses due to mode conversion from transverse electromagnetic mode (TEM) mode specific to wave propagation on a feed-through's coaxial transmission line to transverse magnetic (TM) mode specific to surface wave propagation along the metal probe. Finally, there are microwave power losses during wave propagation along the metal probe, with the loss value generally being in the range of 0.1 to 0.4 dB/m, depending on the probe design, its surface modification, its ohmic resistance, and relative distance between the probe and the surrounding metal surfaces.

Disclosed embodiments include coaxial feed-throughs for coupling a process connection to a nozzle or to a top surface of a storage tank, including an inner electrical conductor (probe), an outer electrical conductor, and a dielectric sleeve disposed between the probe and the outer electrical conductor, so that the feed-through behaves as a coaxial transmission line (CTL). The dielectric sleeve of this CTL generally has a total electrical length of about 0.8$\lambda$ to 1.2$\lambda$ along the probe direction, where $\lambda$ is the center wavelength associated to the bandwidth of the interrogation signal (generally $\geq 1$ GHz, such as about 2 GHz for a pulse of 0.5 ns and about 6 GHz, for a pulse width of 0.15 ns), as described by the time domain reflectometry principle used by GWR instruments.

Along the probe direction, the dielectric sleeve can be divided into two regions: the upper dielectric sleeve (near the 50$\Omega$ coaxial cable), which used for making the upper CTL portion of the feed-through, with an impedance which substantially equal to 50$\Omega$) and lower dielectric sleeve, which is used for making a lower CTL portion of the feed-through. As used herein, "substantially equal to 50$\Omega$" is defined as 50$\Omega \pm 20\%$, being 50$\Omega \pm 10\%$ and some embodiments. This lower CTL portion of the feed-through has a sub-portion with an impedance that is at least forty (40) % higher as compared to the substantially 50$\Omega$ impedance segment of the upper CTL segment.

Disclosed coaxial feed-throughs minimize the impedance mismatch between feed-through and the nozzle of the tank or between the feed-through and the top surface of the tank, which provide a significant reduction in the above-described microwave power losses, generally providing a reduction in microwave losses of 5 dB or more (described in the Examples section below). The significant reduction in microwave power losses provided by disclosed feed-throughs enables a more accurate level measurement and a reduced dead-region for level measurement near the top surface of the tank. Moreover, the reduction in microwave power losses provided by disclosed feed-throughs also enables extending the level detection range beyond the range provide by known feed-throughs.

DETAILED DESCRIPTION

Figure 1A:
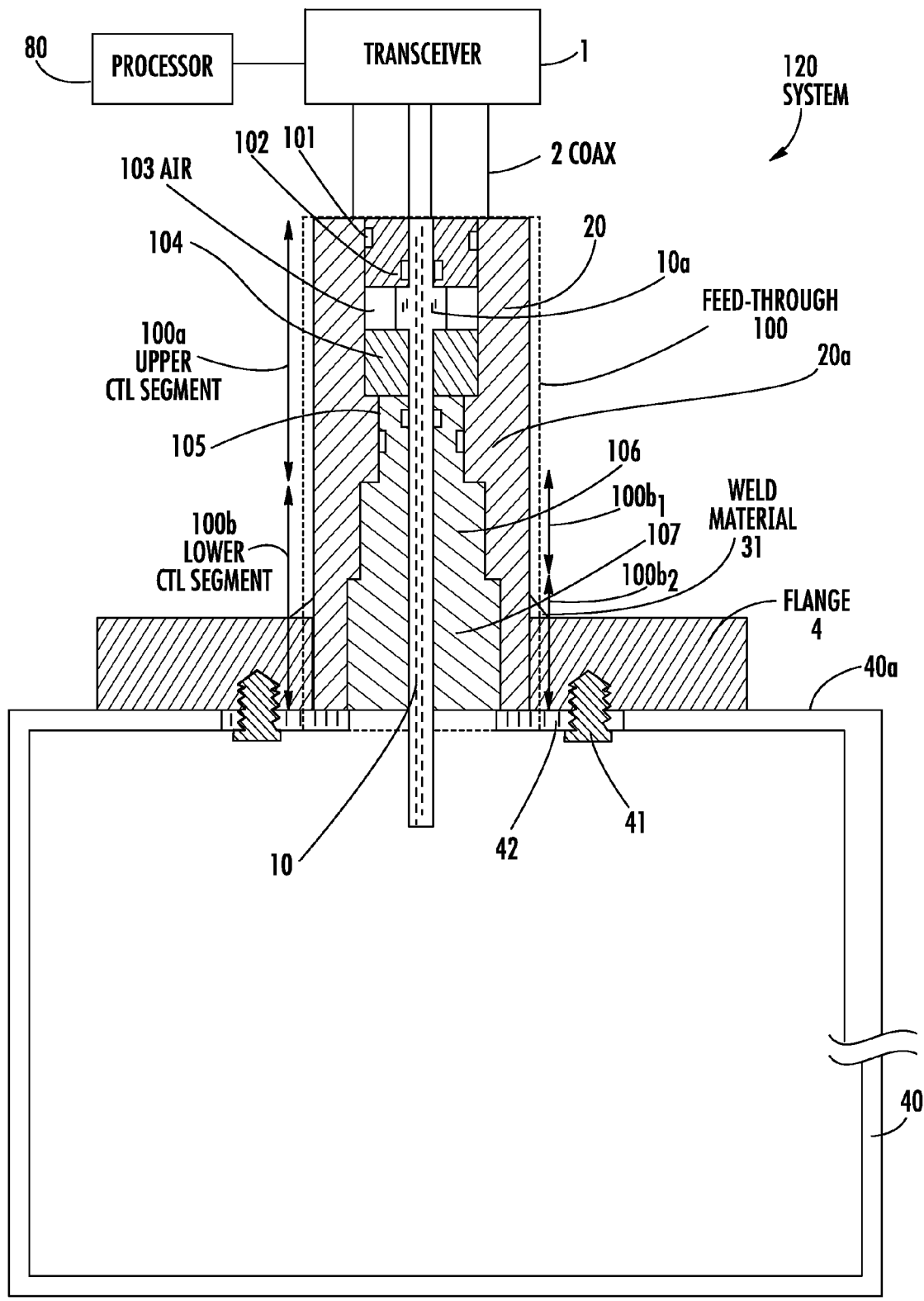
FIG. 1A shows a depiction of a GWR system including an example coaxial feed-through having an upper CTL segment providing a substantially 50Ω impedance and a lower CTL segment having multiply stepped dielectric regions connecting a GWR process connection comprising a electronics block coupled to a transmission line connector shown as a coaxial cable to a top surface of a storage tank having a flange thereon, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments include coaxial feed-throughs which include a lower dielectric sleeve portion which minimizes the impedance mismatch between the feed-through and the nozzle for tanks having a nozzle, or between the feed-through and the top of the tank for nozzle-less tanks. FIG. 1A shows a GWR system 120 including an example coaxial feed-through 100 having an upper CTL segment 100a providing a substantially 50Ω impedance and a lower CTL segment 100b having multiple stepped thickness dielectric regions including dielectric 106 and dielectric 107 connecting a GWR process connection comprising a electronics block comprising a processor 80 coupled to a transceiver 1 which is coupled to a transmission line connector shown as a coaxial cable 2 to the top surface 40a of a storage tank 40 having a metal flange 4 thereon, according to an example embodiment.

Feed-through 100 includes an inner electrical conductor (probe) 10 and an outer electrical conductor 20 (e.g., stainless steel) having a protruding shoulder 20a. Probe 10 has a protruding metal extension region 10a. The outer electrical conductor 20 of the feed-through 100 is shown welded by a weld material 31 to the top of the flange 4. The flange is shown secured and sealed to the top surface 40a of the tank 40 by a fastener 41 (e.g., a stainless steel bolt) to a stopper sleeve 42 that generally comprises metal. In this embodiment, the conventional tubular cylindrical region of dielectric used for the lower CTL segment is replaced by a multiply-stepped dielectric region shown as a dual-stepped thickness dielectric 106, 107 including dielectric 106 and dielectric 107. The bottom side of the feed-through 100 is shown welded to the flange 4. The tank 40 can comprise a metallic (e.g., metal or metal alloy) tank or a non-metallic tank such as concrete or polymer-based tank.

The dielectric sleeve disposed between the probe 10 and outer electrical conductor 20 in upper CTL segment 100a which as noted above provides a substantially 50 ohm impedance comprises from top down a dielectric 102 such as comprising a polyether ether ketone (PEEK) sealed by a dielectric O-ring 101 such as comprising a fluoroelastomer such as VITON®, a registered trademark of E. I. DuPont de Nemours and Company for which is a synthetic rubber and fluoropolymer elastomer then an air gap 103, then a dielectric ring 104 such as comprising a polyetherimide such as ULTEM®, a registered trademark of General Electric Company for which is a family of amorphous thermoplastic polyetherimide (PEI) resins, then dielectric 105 such as comprising polytetrafluoroethylene (PTFE). Dielectric ring 104 is configured as a load ring which supports the weight of the probe 10, which can be around 6-8 kg depending on its length.

Feed-through 100 is configured as with conventional feed-throughs so that the ambient gas(es) in the interior of the tank 40 does not leak out. Preventing leaks is the reason there are o-rings shown in FIG. 1A sealing the inner and outer side of the dielectric sleeve including o-ring 101 (sealing the outer side of the dielectric sleeve) and other o-rings that are un-numbered. The dielectric sleeve in the lower CTL segment 100b comprises from top down dielectric 106 in sub-segment $100b_1$ on dielectric 107 in sub-segment $100b_2$. At least a portion of the lower CTL segment 100b provides an impedance that is at least forty (40) % higher as compared to the substantially 50Ω impedance of the upper CTL segment 100a, which can be compared to the essentially 50Ω impedance provided by conventional feed-throughs throughout their entire length.

An electrical length of the lower CTL segment 100b is generally 0.4λ to 0.6λ at a center frequency of operation of at least 1 GHz. An electrical length of the upper CTL segment 100a is generally 0.4λ to 0.6λ at a center frequency of operation of at least 1 GHz, so that the feed-through 100 generally has an electrical length of 0.8λ to 1.2λ at the center frequency of operation.

The coaxial feed-through 100 having the dual-stepped thickness dielectric 106, 107 creates an increase in the impedance for the feed-through's transmission line as one moves toward the top surface 40a of the tank 40, where the electrical length of the dielectrics 106 and 107 are shown about equal, and can each be equal to about ¼λ. For example, by decreasing the thickness of the outer electrical conductor 20 as shown in FIG. 1A, the diameter of a dielectric material for dielectrics 106 and 107, such as comprising PTFE, can be increased. It is noted that the thickness of the outer electrical conductor 20 in the feed-through design should generally consider mechanical aspects related to mechanical resistance of the metal sleeve when exposed to maximum temperatures and pressures.

As an example, for a typical geometry of the probe 10, and the above changes in the thickness of the dielectric for the dual-stepped thickness dielectric 106, 107, an impedance calculation for this type of coaxial transmission line have shown that an increase from 50Ω to around 65Ω±10% Ω can be obtained for dielectric 106 in sub-segment $100b_1$, while the impedance of the sub-segment $100b_2$ can be around 80Ω±10% Ω.

Such an increase of feed-through impedance from 50Ω for conventional feed-throughs to around 80Ω along the feed-through in the lower CTL segment 100b results in significantly decreasing the reflection signals from the output of the feed-through 100 to the input of the nozzle of the tank or the top of the tank for a nozzle-less tank, depending on the type of process connection. An increase in the feed-through impedance from conventional 50Ω in the upper sub-segment $100b_1$ of the lower CTL segment 100b to about 65Ω±10% then to about 80Ω±10% in lower sub-segment $100b_2$ has been found to improve the impedance adaptation between the feed-through and the nozzle (typically an impedance of 120 to 180Ω), or between feed-through and the top of the tank (about 370Ω for the probe 10 in free-space) for the case threaded process connection. The COMSOL simulations described below relative to FIG. 4B evidence a significantly improved efficiency of this dual-stepped coaxial feed-through compared to a conventional control feed-through. COMSOL MULTIPHYSICS®, a registered trademark of Comsol AB Corporation Sweden, is a trademark for a finite element analysis (FEA) solver and simulation software/FEA software package for various physics and engineering applications.

Figure 1B:
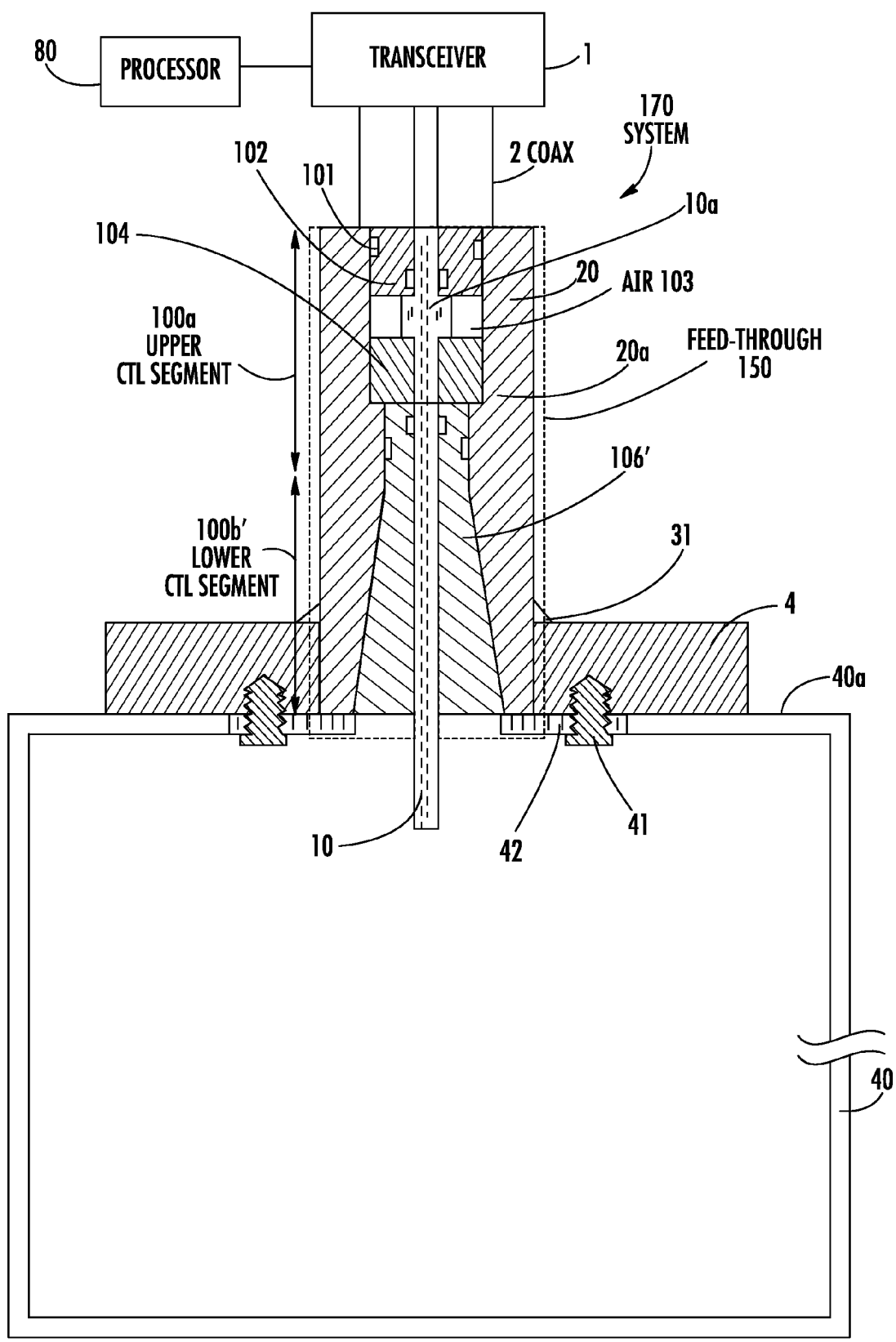
FIG. 1B shows a depiction of a GWR system including an example coaxial feed-through having an upper CTL segment providing a substantially 50Ω impedance and a lower CTL segment having a linearly tapered dielectric connecting a GWR process connection comprising an electronics blocks coupled to a transmission line connector (shown as a coaxial cable) to the top surface of a storage tank having a metal flange thereon, according to an example embodiment.

Similarly, in another embodiment, replacing the disclosed dual stepped thickness dielectric 106, 107 shown in FIG. 1A with the linearly tapered dielectric thickness shown in FIG. 1B (or non-linearly tapered dielectric region shown in FIG. 2 described below) the feed-through impedance can increase along the feed-through in the lower CTL segment from a conventional 50Ω to higher impedance values analogous to those provided by lower CTL segment 100b shown in FIG. 1A. The linear tapered dielectric provides a gradual (logarithmic) increase in the impedance of lower CTL segment to provide enhanced impedance matching for either a feed-through connected to a nozzle or a feed-through threaded to the top of the tank, for either a metallic tank or a non-metallic tank.

Figure 2:
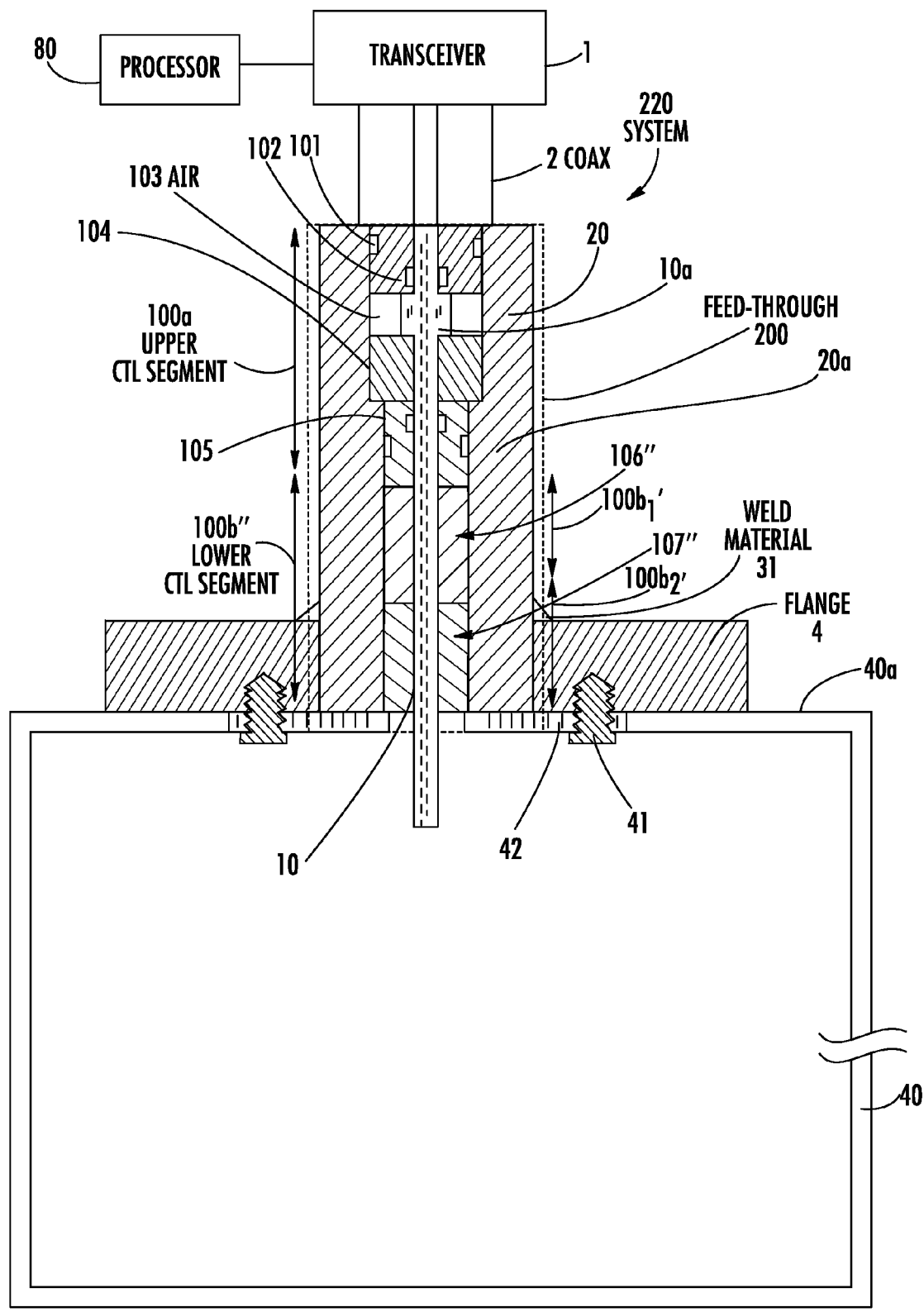
FIG. 2 shows a depiction of a GWR system including an example coaxial feed-through having an upper CTL segment providing a substantially 50Ω impedance and a lower CTL segment having different dielectric materials connecting a GWR process connection comprising a electronics block coupled to a transmission line connector shown as a coaxial cable to a top surface of a storage tank having a flange thereon, according to an example embodiment.

FIG. 1B shows a GWR system 170 including an example coaxial feed-through 150 having an upper CTL segment 100a providing a substantially 50Ω impedance arranged as in FIG. 1A with a lower CTL segment 100b' having a linearly tapered dielectric 106' connecting a GWR process connection comprising a electronics block comprising a processor 80 coupled to a transceiver 1 coupled to a transmission line connector shown as a coaxial cable 2 to the top surface 40a of a storage tank 40 having a metal flange 4 thereon, according to an example embodiment. The linearly tapered dielectric 106' also improves the impedance matching of output of the feed-through 150 towards the top surface 40a of the tank 40 as shown in FIG. 2, or to a nozzle for tanks having a nozzle (see FIG. 3B described below). The linearly tapered dielectric 106' can provide about a 50Ω impedance at its interface with upper CTL segment 100a logarithmically increasing in impedance so that at the bottom of the linearly tapered dielectric 106' the impedance is ≥40% above the 50Ω impedance in upper CTL segment 100a, such as terminating at about 80Ω±10%.

In other embodiments, rather than changing the dielectric thickness of a common dielectric material along the radial direction in the lower CTL segment to achieve the desired impedance profile as shown in FIG. 1A (lower CTL segment with stepped dielectric thickness 100b) and FIG. 1B (lower CTL segment with logarithmically increasing thickness 100b'), different dielectric materials are used to achieve an analogous disclosed impedance result. FIG. 2 shows a depiction of a GWR system 220 including an example coaxial feed-through 200 having an upper CTL segment 100a providing a substantially 50Ω impedance and a lower CTL segment 100b" having different dielectric materials 106" and 107" in upper sub-segment $100b_1$' and in lower sub-segment $100b_2$' respectively connecting a GWR process connection comprising a electronics block coupled to a transmission line connector shown as a coaxial cable to a top surface of a storage tank 40 having a flange 4 thereon, according to an example embodiment.

In the GWR system 220 embodiment shown in FIG. 2, the CTL feed-through uses different dielectric materials having different dielectric constants to provide an increase in impedance toward the tank 40. The different dielectric materials having different dielectric constants in the lower CTL segment 100b" of the feed-through 200 provides an impedance which increases from dielectric 105 (at the lower part of upper CTL segment 100a) to dielectric 106", and from dielectric 106" to dielectric 107", without any need for changing the inner profile of the outer metal sleeve 20 (which can remain cylindrical throughout as shown). For example, in one specific embodiment, dielectric 105 can be 30% glass reinforced ULTEM®, a registered trademark of General Electric Company, (dielectric constant of =3.7), dielectric 106" can be standard ULTEM®, a registered trademark of General Electric Company, (dielectric constant of =3.1), and dielectric 107" can be PTFE (dielectric constant of 2). Air can also be used for dielectric 107" where the dielectric constant of air is essentially 1. The air's dielectric constant may increase to significantly above 1 due to a pressure increase, as is generally the case for products such as steam or ammonia in the tank. Moreover, in some embodiments, both the dielectric thickness along radial direction is non-constant (e.g., a stepped dielectric thickness or logarithmically changing dielectric thickness) and different dielectric materials are used in the lower CTL segment.

Figure 3A:
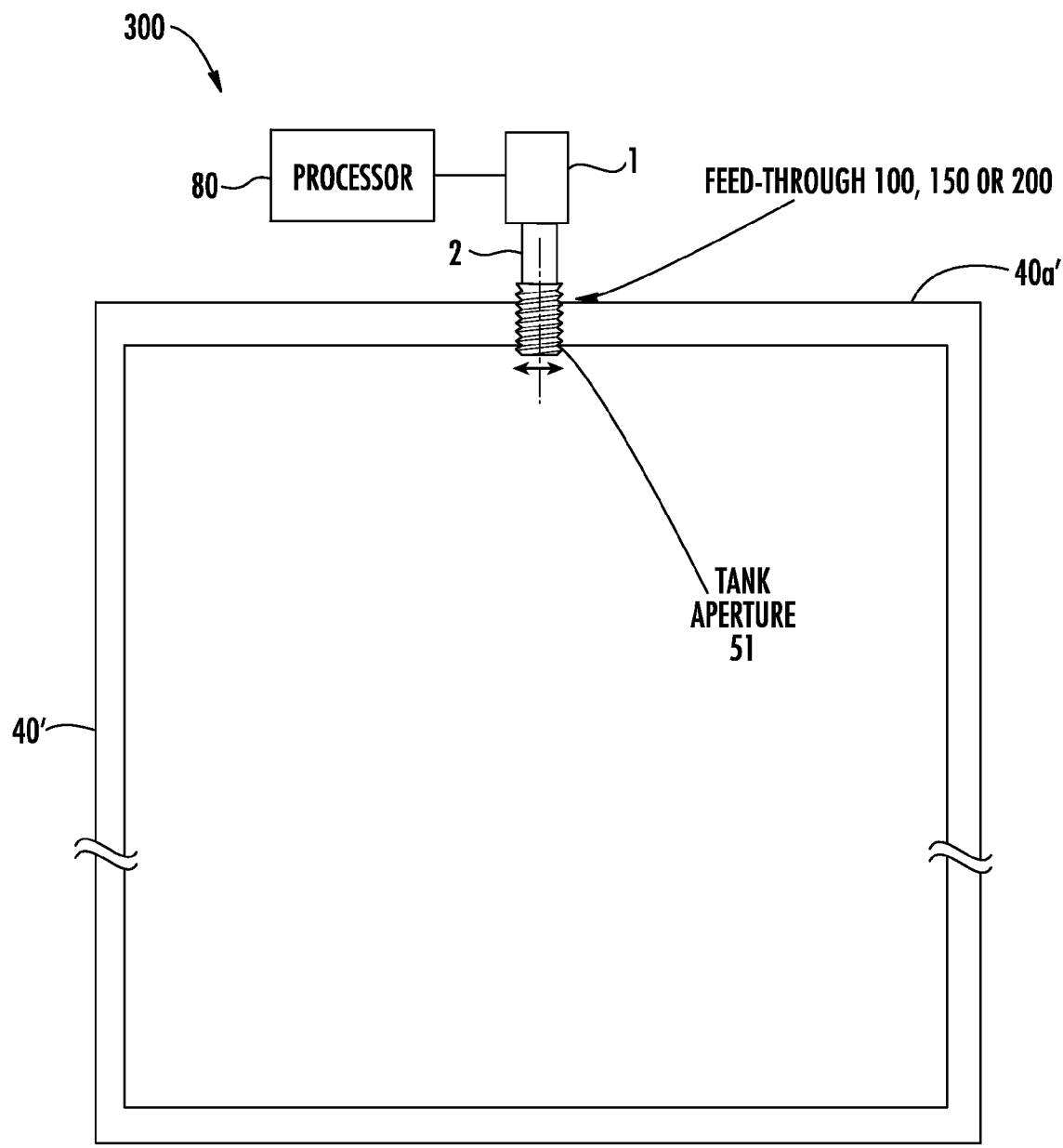
FIG. 3A shows a depiction of a GWR system including an example coaxial feed-through having an upper CTL segment providing a substantially 50Ω impedance and a lower CTL segment having the dielectric sleeve arrangement shown in FIG. 1A, FIG. 1B or FIG. 2, where the feed-through is threaded to an aperture in the top surface of the tank over a tank aperture, according to an example embodiment.

FIG. 3A shows a depiction of a GWR system 300 including an example coaxial feed-through 100 (shown in FIG. 1A), feed-through 150 (shown in FIG. 1B), or feed-through 200 (shown in FIG. 2) having an upper CTL segment (see upper CTL segment 100a in FIG. 1A, FIG. 1B, or FIG. 2) providing a substantially 50Ω impedance and a lower CTL segment (see lower CTL segment 100b FIG. 1A, 100b' in FIG. 1B, or 100b" in FIG. 2) providing an impedance ≥40% above the 50Ω impedance in upper CTL segment, according to an example embodiment. The feed-through 100, 150 or 200 is threaded to an aperture 51 in the top surface 40a' of a metal tank 40'. Tank 40' can be a metal or a non-metal (e.g., polymer-based) tank. However, in the case of non-metal tank, the feed-through 100, 150 or 200 is threaded into a metal sheet (not shown here) which is sealed to the tank aperture.

Figure 3B:
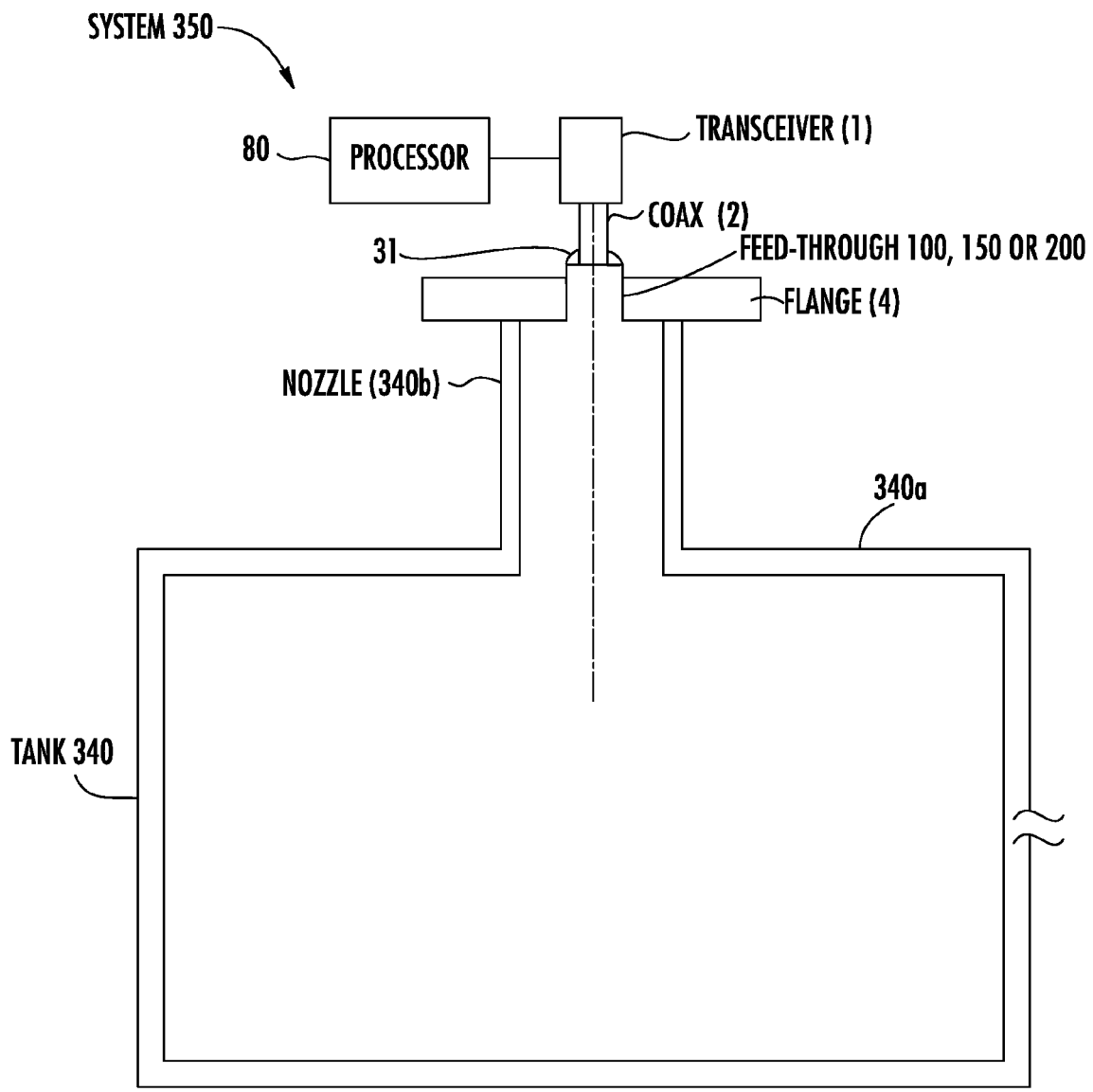
FIG. 3B shows a depiction of a GWR system including an example coaxial feed-through having an upper CTL segment providing a substantially 50Ω impedance and a lower CTL segment having the dielectric sleeve arrangement shown in FIG. 1A, FIG. 1B or FIG. 2, where the feed-through has its outer conductor "sleeve" welded to a flange on a metal nozzle having an aperture, according to an example embodiment.

FIG. 3B shows a depiction of a GWR system 350 including an example coaxial feed-through 100 (shown in FIG. 1A) or feed-through 150 (shown in FIG. 1B) or feed-through 200 (shown in FIG. 2) having an upper CTL segment (see upper CTL segment 100a in FIG. 1A, FIG. 1B or FIG. 2) providing a substantially 50Ω impedance and a lower CTL segment (see lower CTL segment 100b FIG. 1A or 100b' in FIG. 1B or 100b" in FIG. 2) providing an impedance ≥40% above the 50Ω impedance in upper CTL segment, according to an example embodiment. The feed-through 100 or 200 has its outer conductor welded by a weld material 31 to a flange 4 on a metal cylindrical tank nozzle 340b over a top surface 340a of a tank 340. The nozzle 340b has an impedance of about 120 to 180Ω (the impedance depending on the diameter of the probe 10 and diameter of the nozzle 340b) having an aperture. In this embodiment the tank 340 can be a metal or metal alloy or a non-metallic tank As an example, a sequence of feed-through assembly for the case of a feed-through connection to a metal flange, such as the flange 4 shown in FIG. 1A, FIG. 1B, FIG. 2 or FIG. 3B is described below.

1. Provide or prepare an outer metal conductor 20 (e.g., comprising stainless steel (SSt)) as the initial component of the feed-through having a protruding shoulder 20a.

2. Weld the outer metal conductor 20 to the flange 4. This step is only applicable for the case of a feed-through connected to a flange.

3. Insert a dielectric ring 104 such as comprising a polyetherimide (PEI) which is an amorphous, amber-to-transparent thermoplastic with characteristics similar to the related plastic PEEK, marketed as an ULTEM®, a registered trademark of General Electric Company, ring in the outer metal conductor 20 by sliding it from the top side up to the protruding shoulder 20a of the outer metal conductor 20, where it will be stopped.

4. Insert the probe 10 into the feed-through by sliding it from the top side. The probe 10 has a widened portion which will be stopped by the dielectric ring 104.

5. Insert an O-ring 101 such as comprising a PEEK ring (containing the O-rings shown in FIGS. 1A, 1B and 2) in the top of the feed-through up to the metal extension 10a of the probe 10, where it will stopped, and thus defining the air chamber 103 surrounding the metal extension 10a of the probe 10.

6. Insert the dielectric(s) 106, 107 (dual-stepped thickness dielectric 106, 107 shown in FIG. 1A) or 106' (tapered dielectric shown in FIG. 1B), such as comprising VITON®, a registered trademark of E. I. DuPont de Nemours and Company, O-rings, or 106" and 107" (different dielectric materials shown in FIG. 2) in the feed-through on the bottom side (according to FIG. 1A or 1B).

7. Add the stopper sleeve 42 on the bottom side of the flange 4 and fix it there, such as by the fasteners 41 (e.g., bolts) shown in FIGS. 1A, 1B and 2.

Disclosed feed-throughs can be used on a wide variety of process connections for GWR systems for tanks providing a significant improvement in the impedance matching as compared to conventional 50Ω feed-throughs throughout the length of the feed-through.

EXAMPLES

Disclosed embodiments are further illustrated by the following specific Examples, which should not be construed as limiting the scope or content of this Disclosure in any way.

COMSOL®, a registered trademark of Comsol AB Corporation Sweden, simulation results data specific to time domain reflectometry are described below, where there are shown examples of the initial interrogation pulse with a peak of 1.8 V and full width at half maximum (FWHM) of 0.5 ns and echoes (pulses) coming from the end of the feed-through (flange location), which is a parasitic echo, and a metal target (a perfect electric conductor) which is located at a 1 m distance from the signal source (generating the above voltage peak), for different geometries of the feed-through, as per disclosed embodiments. In between these two echoes from above there may be other parasitic echoes, originating in multiple reflections coming from end of the feed-through and metal target. The simulation results compare voltage echoes obtained from disclosed feed-throughs having dielectric arrangements that raise the impedance in the lower CTL segment as compared to the impedance in the upper CTL segment to a control feed-through having a conventional tubular cylindrical dielectric sleeve in both the upper CTL segment and the lower CTL segment that provides an essentially 50Ω impedance throughout. Here, there are shown simulation results which are obtain in COMSOL®, a registered trademark of Comsol AB Corporation Sweden, which is a commercially available multipurpose software platform for simulating a variety of physics-based problems. However, other modeling and simulation tools can also be used.

Figure 4A:
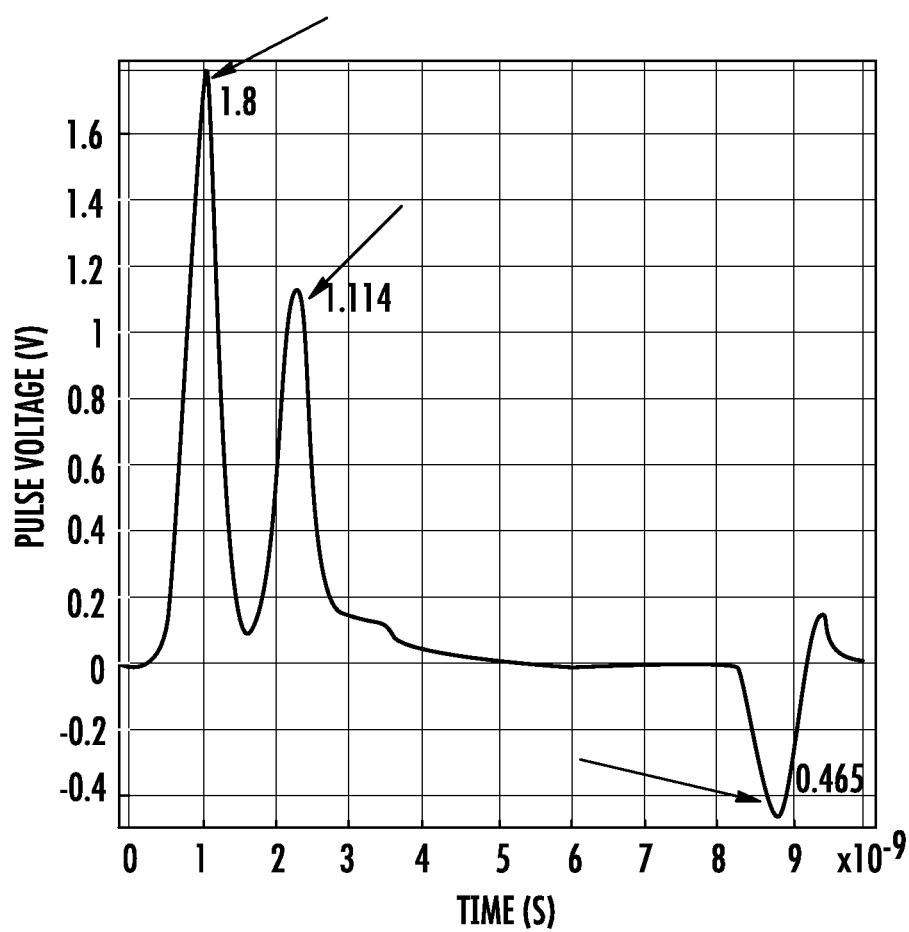
FIG. 4A shows COMSOL®, a registered trademark of Comsol AB Corporation Sweden, Multiphysics (COMSOL®, a registered trademark of Comsol AB Corporation Sweden) simulation results for a control feed-through connected via a metal flange to a top surface of a non-metallic tank.

The COMSOL®, a registered trademark of Comsol AB Corporation Sweden, simulation results shown in FIG. 4A are for the control feed-through connected via a 150 mm diameter metal flange which is sealed to an aperture in the top surface of a non-metallic tank. The amplitude of interrogation pulse (having a pulse width equal to 0.5 ns) is shown as 1.8 V. The amplitude of the echo signal that is reflected from the end of feed-through (flange) for this control feed-through is shown having an amplitude of 1.114V. This parasitic echo has a high value of the signal amplitude, which reduces the signal power propagating along the probe that can be used for level/interface measurement with a high signal to noise ratio (SNR). The magnitude of signal attenuation due to parasitic signal reflection at the flange position is calculated as:

$$Atten_1=20*\log(1.8/1.114)=4.16 \text{ dB}.$$

Purposely, the negative sign which used in the formula of attenuation is ignored. $Atten_1$ is the result of an impedance mismatch between the impedance of feed-through (about 50Ω) and the top of the tank (impedance of the probe 10 in free space is equal to 370Ω). The amplitude of the (echo) signal reflected from a metal target (modeled as a perfect electric conductor) located at a 1 m distance from the flange is shown as having an amplitude of −0.465V. Signal attenuation due to signal reflection at the metal target is calculated as:

$$Atten_2=20*\log(1.8/0.465)=11.75 \text{ dB}.$$

Figure 4B:
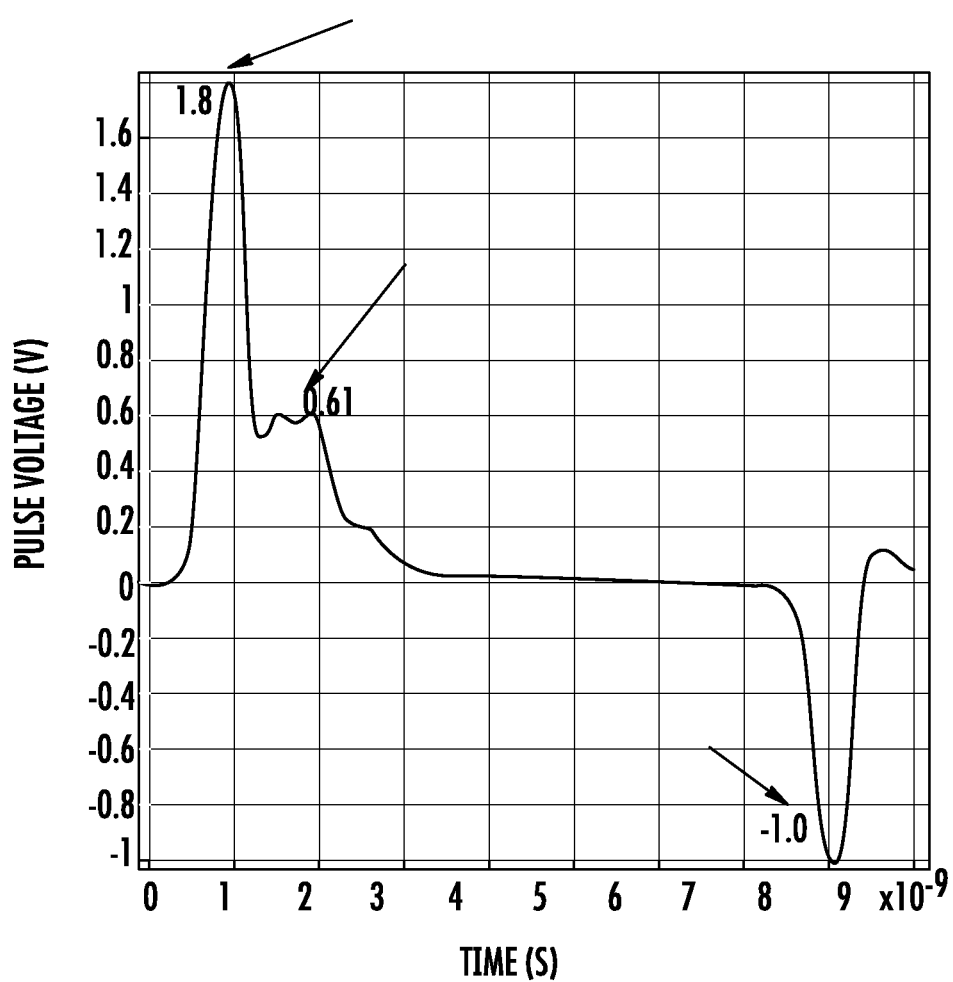
FIG. 4B are COMSOL®, a registered trademark of Comsol AB Corporation Sweden, simulation results evidencing an enhanced efficiency for a disclosed feed-through having a dual-stepped dielectric connected via a metal flange to a non-metallic tank as compared to the control feed-through having data shown in FIG. 4A.

The COMSOL®, a registered trademark of Comsol AB Corporation Sweden, simulation results shown in FIG. 4B evidence by numerical COMSOL®, a registered trademark of Comsol AB Corporation Sweden, calculations an enhanced efficiency for a disclosed feed-through having a dual-stepped dielectric (see FIG. 1A) connected via a 150 mm metal flange to a non-metallic tank as compared to the control feed-through having the data shown in FIG. 4A. The amplitude of interrogation pulse (pulse width is equal to 0.5 ns) is again shown as 1.8 V. The amplitude of the (echo) signal reflected from the flange is shown as 0.61V. It can be observed that due to a better impedance matching between the output of feed-through at the flange location (about 80 Ω±10%) and the probe impedance in free space at the top of the tank (370Ω) provided by the disclosed feed-through having a dual-stepped dielectric, the calculated amplitude of the parasitic reflected signal from the flange has decreased from 1.114 V to 0.61 V. A lower amplitude parasitic echo from the end of the feed-through (flange location) provides a higher value for "Atten1":

$$Atten_1=20*\log(1.8/0.61)=9.4 \text{ dB}.$$

This increased value of Atten1 is an improvement of 5.24 dB with respect to the control feed-through having its performance shown in FIG. 4A.

The amplitude of the (echo) signal reflected from a metal target (modeled as a perfect electric conductor) located at a 1 m distance from the flange is shown having an amplitude of −1.0 V. The signal attenuation due to signal reflection at the metal target is calculated as:

$$Atten_2=20*\log(1.8/1)=5.1 \text{ dB}.$$

Due to increased value of the reflected useful signal (in the denominator), a lower value for the $Atten_2$ is calculated with respect to the target signal, which enables the useful signal to be more easily discriminated from background noise thus providing an improved design. The useful signal reflected from a target located at 1 m distance from the signal source magnitude is thus improved relative to the control feed-through having its performance shown in FIG. 4A by about 6.65 dB.

Figure 4C:
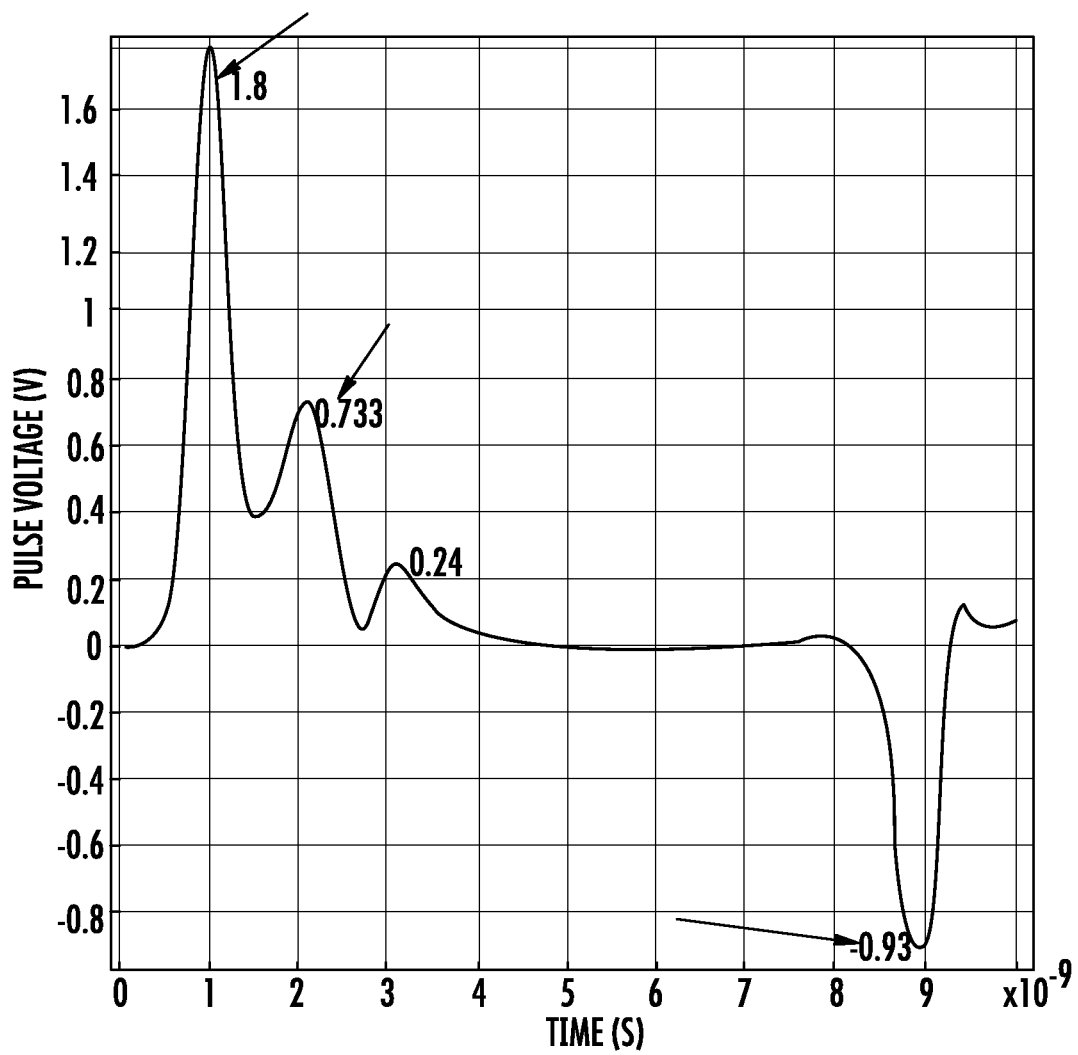
FIG. 4C are COMSOL®, a registered trademark of Comsol AB Corporation Sweden, simulation results evidencing an enhanced efficiency for a disclosed feed-through having a tapered dielectric connected via a metal flange to a non-metallic tank as compared to the control feed-through having data shown in FIG. 4A.

The COMSOL®, a registered trademark of Comsol AB Corporation Sweden, simulation results shown in FIG. 4C evidence an enhanced efficiency relative to the control feed-through for a disclosed feed-through having a tapered dielectric (see FIG. 2) connected via a 150 mm metal flange to the top surface of a nonmetallic tank. The amplitude of the (echo) signal reflected from the flange for the feed-through having a tapered dielectric connected to a non-metallic tank is shown as having an amplitude of 0.733V. In this case, the calculated attenuation is:

$$Atten_1=20*\log(1.8/0.733)=7.8 \text{ dB}.$$

This result evidences an improvement of 3.64 dB with respect to the control feed-through having its performance shown in FIG. 4A.

The amplitude of the (echo) signal reflected from a metal target (perfect electric conductor) located at 1 m distance from the flange is shown as −0.93V in amplitude. Signal attenuation due to signal reflection at the metal target is calculated as:

$$Atten_2=20*\log(1.8/0.93)=5.73 \text{ dB}.$$

This means that the useful signal reflected from a target located at 1 m distance from the signal source is improved relative to the control fed-through by about 6.02 dB.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A coaxial feed-through for coupling a received process connection to a storage tank, comprising:
    an inner probe;
    an outer electrical conductor; and
    a dielectric sleeve disposed between said probe and said outer electrical conductor;
    wherein said dielectric sleeve is configured to provide said feed-through an upper coaxial transmission line segment providing a substantially 50 ohm impedance and a lower coaxial transmission line segment closer to said tank than said upper coaxial transmission line segment that includes one or more sub-segments having an impedance that is at least forty (40%) percent higher as compared to said substantially 50 ohm impedance.

2. The feed-through of claim 1, wherein said dielectric sleeve has a common dielectric material throughout said lower coaxial transmission line segment.

3. The feed-through of claim 2, wherein said one or more sub-segments include at least a first sub-segment and a second sub-segment having a difference in thickness of said common dielectric material of at least twenty (20%) percent.

4. The feed-through of claim 3, wherein an impedance of said first sub-segment is 65 ohms±10% and an impedance of said second sub-segment is 80 ohms±10%.

5. The feed-through of claim 2, wherein said dielectric sleeve in said lower coaxial transmission line segment provides a linearly tapered thickness for said common dielectric material increasing linearly in thickness from a top of said lower coaxial transmission line segment to a bottom of said lower coaxial transmission line segment.

6. The feed-through of claim 1, wherein said outer electrical conductor includes a protruding shoulder at a bottom of said upper coaxial transmission line segment and said feed-through has a constant cross section area along its entire length.

7. The feed-through of claim 1, wherein said dielectric sleeve has two or more different dielectric materials in said lower coaxial transmission line segment.

8. The feed-through of claim 1, wherein said tank includes a nozzle having a metal flange on said nozzle, wherein said feed-through is welded by a weld material to said metal flange.

9. The feed-through of claim 1, wherein said feed-through is threaded to a tank aperture in a top surface of said tank.

10. The feed-through of claim 1, wherein said feed-through is welded to a metal flange that is on a top surface of said tank.

11. A guided wave radar (GWR) system, comprising:
an electronic block including a processor coupled to a transceiver that is coupled to a transmission line connector providing a process connection which is coupled by a coaxial feed-through to a storage tank;
said feed-through including: an inner probe;
an outer electrical conductor; and
a dielectric sleeve disposed between said probe and said outer electrical conductor;
wherein said dielectric sleeve is configured to provide said feed-through an upper coaxial transmission line segment providing a substantially 50 ohm impedance and a lower coaxial transmission line segment closer to said tank than said upper coaxial transmission line segment that includes one or more sub-segments having an impedance that is at least forty (40%) percent higher as compared to said substantially 50 ohm impedance.

12. The system of claim 11, wherein said dielectric sleeve has a common dielectric material throughout said lower coaxial transmission line segment.

13. The system of claim 12, wherein said one or more sub-segments include at least a first sub-segment and a second sub-segment having a difference in thickness of said common dielectric material of at least twenty (20%) percent.

14. The system of claim 13, wherein an impedance of said first sub-segment is 65 ohm±10% and an impedance of said second sub-segment is 80 ohm±10%.

15. The system of claim 12, wherein said dielectric sleeve in said lower coaxial transmission line segment provides a linearly tapered thickness for said common dielectric material increasing linearly in thickness from a top of said lower coaxial transmission line segment to a bottom of said lower coaxial transmission line segment.

16. The system of claim 11, wherein said outer electrical conductor includes a protruding shoulder at a bottom of said upper coaxial transmission line segment and said feed-through has a constant cross section area along its entire length.

17. The system of claim 11, wherein said dielectric sleeve has two or more different dielectric materials in said lower coaxial transmission line segment.

18. The system of claim 11, wherein said tank includes a nozzle having a metal flange on said nozzle, wherein said feed-through is welded by a weld material to said metal flange.

19. The system of claim 11, wherein said feed-through is threaded to a tank aperture in a top surface of said tank.

20. The system of claim 11, wherein said feed-through is welded to a metal flange that is on a top surface of said tank.

* * * * *